Figure 1:
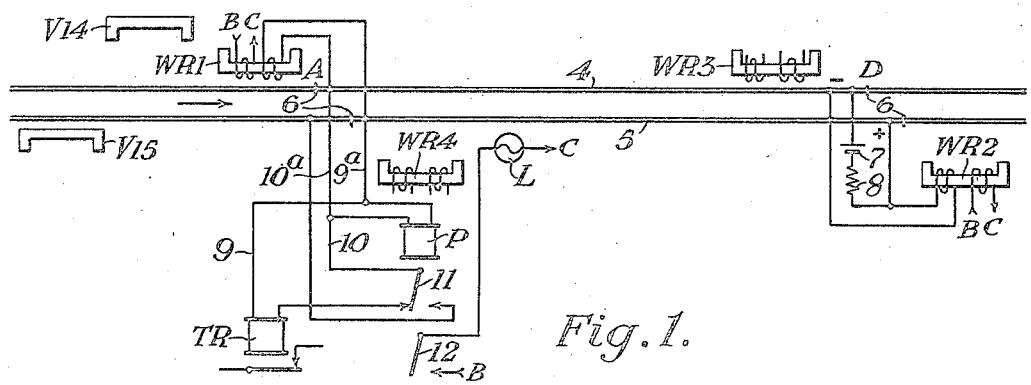

March 3, 1936.   T. J. O'MEARA   2,032,810

RAILWAY SIGNALING APPARATUS

Filed May 7, 1935

INVENTOR
Thomas J. O'Meara.
BY
HIS ATTORNEY

Patented Mar. 3, 1936

2,032,810

UNITED STATES PATENT OFFICE 2,032,810

RAILWAY SIGNALING APPARATUS

Thomas J. O'Meara, Pittsburgh, Pa., assignor to The Union Switch & Signal Company, Swissvale, Pa., a corporation of Pennsylvania Application May 7, 1935, Serial No. 20,144

18 Claims. (Cl. 246—41)

My invention relates to railway signaling apparatus, and more particularly to apparatus of the type involving track circuits.

One of the objects of my invention is to provide track circuits and apparatus employing track circuits which are basically like those heretofore employed, but which are provided with auxiliary devices to further insure the release of a track relay when a car or train enters the associated section.

I will describe several forms of apparatus embodying my invention, and will then point out the novel features thereof in claims.

In the accompanying drawing, Figs. 1 to 4, inclusive, show various forms of track circuits each embodying my invention.

Similar reference characters refer to similar parts on each of the several views.

Referring first to Fig. 1, the reference characters 4 and 5 designate the rails of a railway track, which rails are divided by staggered insulated rail joints 6 to form track sections through which traffic normally moves in the direction indicated by the arrow. Only one complete section, designated A—D, and parts of adjoining sections are shown in the drawing. Each track section is provided with a track circuit including a track relay TR connected across the rails 4 and 5 at one end of the section and a track battery 7 connected across the rails 4 and 5 at the other end of the section. The battery 7 has its negative terminal connected to the rail 4 and its positive terminal connected to the rail 5 as indicated by the negative and positive signs. The track relay TR is a direct current neutral relay of the usual type which moves its contacts to a biased position when deenergized, and is connected to rail 5 over conductors 9 and 9ª and to rail 4 through the normal polar contact 11 of an auxiliary relay P, and conductors 10 and 10ª. It follows that with battery 7 connected to the rails, in the manner shown, current flows from the positive terminal of battery 7, through resistor 8, the track rail 5, conductors 9ª and 9, the winding of relay TR, through normal polar contact 11 of the auxiliary polarized relay P, and over conductors 10 and 10ª, and rail 4, to the negative terminal of battery 7, to energize the relay TR with a given polarity.

The track circuit so far described will be recognized as that which has been quite generally employed in the past, except that the circuit includes a normal polar contact of the auxiliary relay P.

Since some vehicles of the lightweight type cannot be depended upon to effectively shunt the track rails to the extent required to positively insure the release of the track relay TR, and further, since a rubber-tired vehicle will have no shunting effect on the track circuit, such vehicles must be provided with some auxiliary means for insuring that the track relay will be in its released position while the section is occupied.

Referring again to Fig. 1, the auxiliary relay P is employed to open the track circuit just before a train enters the section to effect release of the track relay, and is again employed just after the train clears the section to reclose the track circuit. To provide means for operating the relay P at the times stated, its winding is connected in circuit with the secondary winding of a wayside inductive receiver WR1 placed slightly to the rear of the entrance to section A—D. The secondary winding of this receiver is also connected across the track rails 4 and 5 which, at the exit end of the section, are connected to the secondary winding of a second wayside inductive receiver WR2 placed just in advance of the exit end of section A—D.

On the forward and rear ends of each lightweight, rubber-tired, or similar vehicle or train operating over the stretch, are vehicle inductors V14 and V15 arranged to come into operative relation with the wayside receivers WR1 and WR2, respectively, to provide low reluctance paths for magnetic flux in the receivers when the inductors pass over them. The magnetic flux caused by the energization of the primary windings of these receivers is normally constant, but when an inductor passes over one of the receivers the receiver flux is offered a path of considerably lower reluctance through the inductor core and the flux rapidly increases as the inductor approaches, and decreases as it recedes from the receiver. This produces a complete cycle, or two alternations, of E. M. F. in the secondary winding of the receiver, the first half cycle operating in one direction and the second half cycle in the reverse direction.

Just before a train enters section A—D its inductor V14 passes over the receiver WR1. The first part of the impulse induced in the secondary winding of WR1 tends to hold the polar contacts of relay P in their normal position, as shown, with the track relay TR energized. The second or reverse part of the impulse induced in the secondary winding of WR1, as the inductor 14 passes on over it, is in the reverse direction to the current being supplied to it and to the track relay over the track circuit and accordingly tends to reduce and reverse the flux in the track relay, and at the same time causes the relay P to reverse the position of its polar contacts. The relay P is preferably quick acting and is of a design in which the contacts always remain in their last operated position. The resistance of the winding of relay P, as well as of the secondary windings of inductors WR1 and WR2, is also comparatively high so as to cause a negligible effect on the normal functioning of the track circuit.

The reversal of the polar contact 11 of relay P opens the traced track circuit and holds it open. Since the decay of normal flux in the track relay has been accelerated by a momentary flow of current to it from the secondary of the receiver WR1, the track relay is instantly released.

When the relay P moves its contacts to their reverse position the contact 11 connects the rail 4 of section A—D to the lower rail of the preceding section, thereby enabling the rails of adjoining sections to be employed as the return conductor of an end-to-end train signaling system as effectively as when they are connected together by the wheels and axles of a heavyweight train bridging the dead section at the junction of adjoining track sections. The relay P at its reverse contact 12 also closes an obvious circuit for a wayside lamp signal L which may be employed to advise the enginemen of the proper operation of the relay P.

When the inductor V15 on the rear end of the train passes over the receiver WR2, the secondary winding of WR2 feeds a current impulse over the track rails 4 and 5 to the relay P, first in the direction tending to operate the polar contacts of relay P to their reverse position, followed by a current impulse in the normal direction effective to restore the contacts 11 and 12 to their normal position. By designing relay P so that it is sufficiently quick acting, the latter portion of the final impulse supplied to relay P will also flow through contact 11 in its normal position and through relay TR, and will assist the battery 7 in the picking up of the track relay. A higher resistance 8 in the battery lead may be employed by the foregoing arrangement, thus providing a track circuit of increased sensitivity.

The receiver WR4 corresponds to WR2, being employed in like manner to reclose the track circuit of the section preceding section A—D, while the receiver WR3 corresponds to WR1, being employed in like manner to open the track circuit of the section joining the forward end of section A—D. The circuit connections have been omitted from the receivers WR3 and WR4 as they are identical to those of receivers WR1 and WR2.

Figure 2:
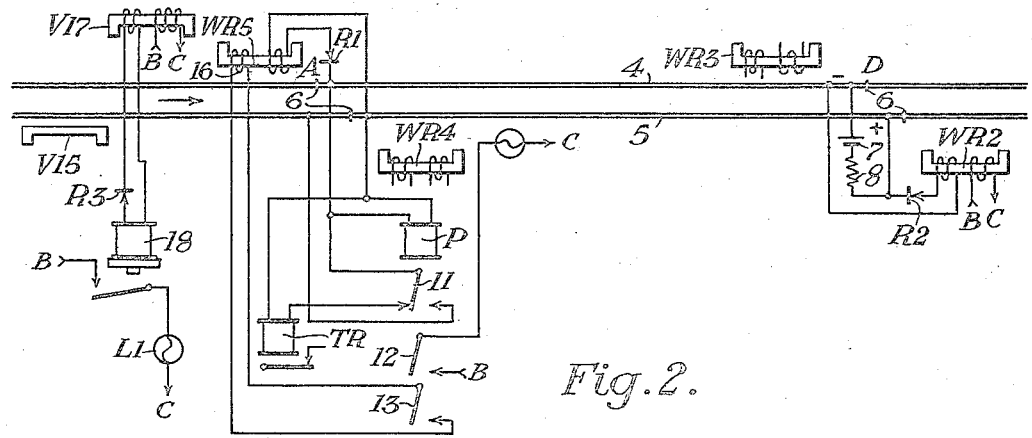

In the form of the invention illustrated by Fig. 2 the track circuit and the arrangement provided for operating the relay P is the same as employed in the arrangement illustrated by Fig. 1, except that a half-wave rectifier unit R1 is included in the secondary circuit of the receiver WR5 and a half-wave rectifier unit R2 has been included in the secondary circuit of receiver WR2. In describing the operation of relay P in connection with Fig. 1 it was explained that the first part of the impulse induced in the secondary winding of receiver WR1 tended to hold the polar contacts of the P relay in their normal position and that similarly the first part of the impulse induced in the secondary of receiver WR2 tended to hold the polar contacts of relay P in their reverse position. By employing the rectifier units R1 and R2 in these circuits as one-way valves the first impulse induced in receivers WR5 and WR2 is prevented from reaching the relay P, and accordingly this relay only receives current when its operation is desired. The employment of rectifier R2 has another advantage as it functions as a valve to prevent any discharge of the battery 7 through the secondary winding of receiver WR2.

In the invention as disclosed in Fig. 2 the primary winding as used on the receiver WR1 is transferred to the vehicle-carried inductor-receiver V17 and instead a snubbing winding 16 is placed on the receiver WR5. The vehicle-carried inductor-receiver V17 in addition to being provided with a primary winding supplied with current from a suitable vehicle-carried current source, is also provided with a secondary winding connected in circuit with a rectifier R3 and slightly slow-acting relay 18, employed in controlling the actuation of a cab signal L1. The rectifier R3, included in the circuit of relay 18, is employed as a valve, in the same manner that rectifier R1 is employed in the circuit of relay P, to prevent the first impulse induced in the secondary winding of inductor-receiver V17 from picking up relay 18.

In this form of the invention, just before a train enters the section A—D the relay P is operated in the manner already explained. On the vehicle, owing to the transformer action between the primary and secondary windings of inductor-receiver V17, the relay 18 receives an impulse of current at the same time that one is received by relay P. If the relay P has properly responded to the impulse of current supplied from the secondary of receiver WR5 at this time, its reverse contact 13 will have closed and rendered the snubbing winding 16 effective to snub or shorten the length of impulse received by relays P and 18 and prevents relay 18 from operating. If, however, the relay P fails to respond, the induced impulse received by relay 18 will be of sufficient duration to operate it. When relay 18 operates, it closes a circuit through signal L1 to advise the engineman that the relay P of the section has failed to operate.

Figure 3:
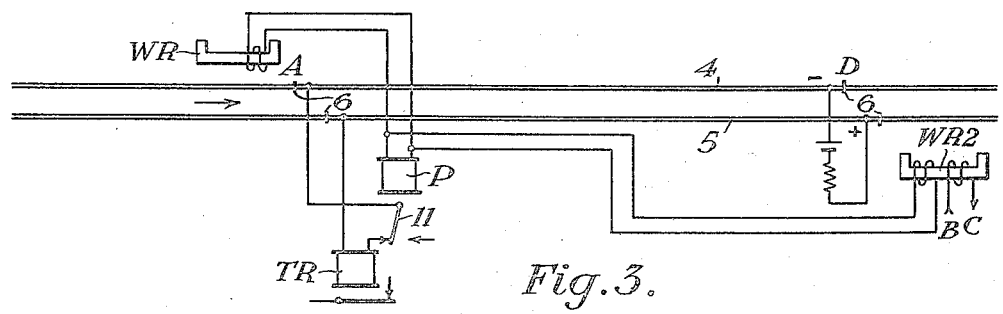

Fig. 3 illustrates a manner in which the operating circuits of the relay P of either Fig. 1 or Fig. 2 may be entirely separated from the track circuit. Such an arrangement may be desirable under certain conditions to eliminate all interference with the normal operation of track circuits, to improve transmission of induced voltages, or in connection with very short track sections. It will be understood that in Fig. 3 only the modified portions of Figs. 1 or 2 are shown and that the circuits and apparatus, to make the disclosure of Fig. 3 complete, may be taken from either Fig. 1 or Fig. 2, in which case receiver WR will take the form of WR1 or WR5.

In the description of operation of the circuits illustrated in Fig. 1 it was pointed out that, when a current impulse is induced in the secondary winding of receiver WR2 in the proper direction to operate the polar contacts of relay P to their normal position, the final portion of such impulse serves to assist battery 7 in the picking up of relay TR after polar contact 11 has reached its normal position. This same feature is also present in the arrangement shown in Fig. 2, but is sacrificed when the circuits are modified in the manner suggested by Fig. 3.

Figure 4:
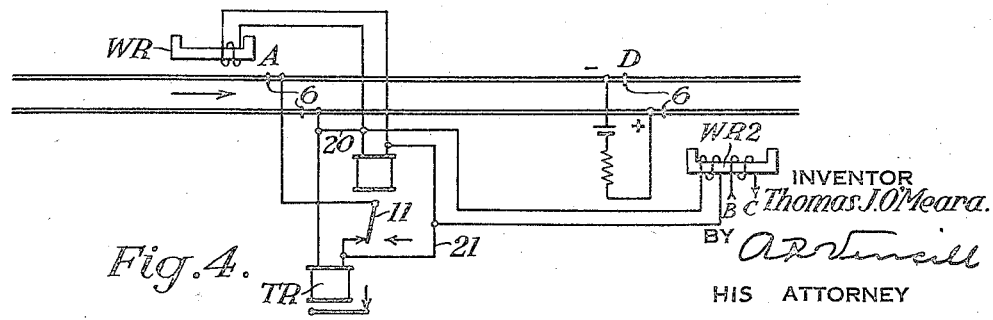

In instances where the arrangements of Fig. 1 or Fig. 2 are modified in the manner suggested by Fig. 3, it may be desirable to further modify such circuits in the manner illustrated in Fig. 4. In the latter illustration the circuits are similar to those of Fig. 3, merely being amplified by the addition of conductors 20 and 21, which connect the relay P permanently in multiple with the track relay TR. With the arrangement of Fig. 1 or Fig. 2 modified in this manner, when a train is about to enter section A—D the impulse which operates the polar contacts of relay P to their reverse position is simultaneously effective to weaken the energizing effect battery 7 has on relay TR, so that at the time contact 11 moves to its reverse position to open the circuit of the track relay, such relay will instantly release.

When the train leaves the section, the current impulse transmitted to the relay P from the receiver WR2 restores the polar contacts of P to their normal position, and in addition a portion of this current will flow through the winding of the track relay in the proper direction to assist battery 7 in energizing the track relay.

While only the form of my invention illustrated by Fig. 2 shows the employment of rectifiers employed as valves to block out undesired impulses supplied by the secondary winding of a wayside receiver, it will be apparent that such rectifiers may, for a like purpose, also be introduced into the secondary circuits of the wayside receivers shown in the other figures without the necessity of otherwise modifying them.

From the foregoing it will be seen that track circuit arrangements such as I employ may be controlled in the usual manner by vehicles or trains of the heavyweight type just as in the past, without the necessity of providing them with inductors, although such trains may obviously be provided with inductors if desired, and that lightweight and rubber-tired vehicles or trains equipped with inductors will also be able to effectively control the track circuit and maintain continuity between rails of adjacent sections as required for an end-to-end train signaling installation, as accomplished by heavyweight vehicles bridging dead sections at the junctions of adjacent sections.

Although I have herein shown and described only a few forms of apparatus embodying my invention, it is understood that various changes and modifications may be made therein within the scope of the appended claims without departing from the spirit and scope of my invention.

Having thus described my invention, what I claim is:

1. In combination, a railway track section; a track circuit for said section including, a source of current, a track relay, and the rails of said section; controlling means for said track relay comprising a polarized relay having a polar contact normally holding said track circuit closed; and means, located to the rear and in advance of said section respectively, influenced by means carried by a train to actuate said polarized relay to open its contact before the train enters the section and to reclose its contact after the train clears said section.

2. In combination, a railway track section; a track circuit for said section including a source of current, a track relay, and the rails of said section; controlling means for said track relay comprising a polarized relay having a polar contact normally maintaining said track circuit closed; inductive means, located to the rear and in advance of said section respectively, influenced by inductive means carried by a train to actuate said polarized relay to open its contact before the train enters said section and to reclose its contact after the train clears said section, train carried signal means responsive to the cooperative action of the inductive means before the train enters the section, and means made effective by the successful actuation of said relay by the cooperative action of said means to prevent the actuation of said signal.

3. In combination with a track section, a polarized relay connected across the rails of the section, a receiver placed to the rear of the section, a primary winding on said receiver, a source of current for energizing said primary winding, a secondary winding on said receiver connected across the track rails at the entrance end of the section, a similar receiver placed a short distance in advance of the exit end of the section and having its secondary winding connected across the rails of the section at the exit end thereof; a track circuit for the section including a source of current, the rails of the section, a track relay, and a normally closed polar contact of said polarized relay; a vehicle carried inductor cooperative with the first encountered receiver to enable its secondary winding to feed current to said polarized relay in the proper direction to cause its polar contact to open, and a vehicle carried inductor cooperative with the second encountered of said receivers to enable its secondary winding to feed current to said polarized relay in the proper direction to cause its polar contact to close.

4. In combination, a track section, a circuit controlling armature having a biased position and an operated position, a track circuit including a current source adapted to normally supply current across the traffic rails of the section; a first means responsive to current from said track circuit, when connected across the traffic rails of said section, to establish a magnetic field for holding the armature in its operated position; a second means effective when in its normal position to connect said first means across the traffic rails of the section and effective when in its alternative position to disconnect said first means from across such traffic rails, means rendered active as a train approaches the section to actuate said second means from its normal to its alternative position, and means rendered active as soon as the train clears the section to return said second means to its normal position.

5. In combination, a track section, a circuit controlling armature having a biased position and an operated position, a track circuit including a current source adapted to normally supply current across the traffic rails of the section; a first means responsive to current from said track circuit, when connected across the traffic rails of said section, to establish a magnetic field for holding the armature in its operated position; a second means effective when in its normal position to connect said first means across the traffic rails of the section and effective when in its alternative position to disconnect said first means from across such traffic rails, a wayside signal for advising enginemen of an approaching train of the operation of said second means and having an operating circuit including a contact closed by said second means only when such second means is in its alternative position, means rendered active as a train approaches the section to actuate said second means from its normal to its alternate position, and means rendered active after the train clears the section to return said second means to its normal position.

6. In combination, a track section, a circuit controlling armature having a biased position and an operated position, a track circuit including a current source connected across the rails of the section; means responsive to current received from said current source, when connected across the traffic rails, to establish a magnetic field for holding said armature in its operated position; a polarized relay having a polar contact employed to connect said means across the traffic rails while in its normal position and to disconnect such means from across such rails while in its reverse position, means rendered active by a train about to enter the section to effect the energization of said polarized relay in the proper direction to move its polar contact to its reverse position just before the train enters the section, and means rendered active by a train immediately after it has cleared the section to effect the energization of said polarized relay in the proper direction to restore its polar contact to its normal position.

7. In combination, a track section, a circuit controlling armature having a biased position and an operated position, a track circuit including a current source connected across the rails of the section; means responsive to current received from said current source, when connected across the traffic rails, to establish a magnetic field for holding said armature in its operated position; a polarized relay having a polar contact employed to connect said means across the traffic rails while in its normal position and to disconnect such means from across such rails while in its reverse position, means rendered active by a train about to enter the section to effect the energization of said polarized relay in the proper direction to move its polar contact to its reverse position just before the train enters the section, and means rendered active by a train immediately after it has cleared the section to effect the energization of said polarized relay via a circuit including the rails of said section to restore its polar contact to its normal position.

8. In combination with a stretch of railway track, divided into sections; a track circuit for one of the sections of said stretch including a source of current, the rails of such section and a track relay; a polarized relay having a closed contact normally included in said circuit and having the terminals of its winding connected across the rails of said section in multiple with the secondary winding of a trackway receiver located to the rear of such section and having a continuously energized primary winding, a second receiver located just beyond the exit end of the section having a continuously energized primary winding and a secondary winding connected across the rails at the exit end of the section, an inductor on the head end of a train or vehicle cooperative with the first of said receivers just before such train or vehicle enters the section to lower the reluctance of such receiver to effect the transmission of an impulse of current flow into the secondary winding thereof to energize said polarized relay in the proper direction to open its contact, and a second inductor on the rear end of the train or vehicle cooperative with said second receiver to lower its reluctance to effect the transmission of an impulse of current to said polarized relay over said track rails to energize said polarized relay in the proper direction to close its contact.

9. In combinaion with a track section; a track circuit for said section including a source of current, the rails of said section and a track relay; an auxiliary relay having a normally closed contact included in said circuit, wayside means cooperative with train carried means to open the contact of said auxiliary relay as a train approaches said section, and other wayside means cooperative with other train carried means to reclose the contact of said auxiliary relay after the train has cleared the section.

10. In combination with a track section; a track circuit for said section including a source of current, the rails of said section and a track relay; an auxiliary relay having a normally closed contact included in said circuit, wayside means cooperative with train carried means to energize said relay to open said contact as a train approaches said section, other wayside means cooperative with other train carried means to energize said relay to reclose said contact after the train has cleared the section, a wayside signal for informing enginemen of the operation of said auxiliary relay, and an operating circuit for said signal including a contact of said auxiliary relay closed at the time its normally closed contact is open.

11. In combination with a first section of railway track separated from an adjoining section by insulated joints between the rails at the junction of such sections, a relay for the first section having a normally open contact in a circuit extending between a rail of the first and a rail of the adjoining section respectively, wayside means cooperative with train carried means to operate and close the contact of said auxiliary relay as a train approaches the section, and other wayside means cooperative with other train carried means to operate and reopen the contact of said relay as the train leaves such first section.

12. In combination with a track section, a track relay, an auxiliary relay of the polarized type wherein the polar contact remains in the position to which it was moved on the last energization of the relay; a track circuit for said section including a source of current, the rails of said section, a normally closed polar contact of said auxiliary relay and a track relay; an inductive receiver located to the rear of the entrance end of the section and having a secondary winding thereon connected in circuit with the winding of said auxiliary relay, a second receiver placed beyond the exit end of the section and having a secondary winding thereon also connected in circuit with said auxiliary relay, a train carried inductor on the leading portion of a train approaching the section cooperative with the receiver to the rear of the entrance thereof to induce a momentary current impulse in the secondary winding of the receiver to energize said auxiliary relay as required to open its polar contact, and a second train carried inductor on the rear portion of such train cooperative with the receiver beyond the exit end of the section to induce a current impulse in its secondary winding and accordingly in the winding of said auxiliary relay in the proper direction to reclose its polar contact.

13. In combination, a railway track section; a track circuit for said section including a source of current, the rails of the section and a track relay; an auxiliary relay having a normally closed contact included in said track circuit, means slightly in advance of the entrance of the section cooperative with means on the front portion of an approaching train about to enter the section for influencing said auxiliary relay as required to open its contact, and means slightly beyond the exit end of the section cooperative with means on the rear portion of the train to influence said auxiliary relay as required to reclose its contact.

14. In combination with a railway track section, a track relay, an auxiliary relay of the polarized type in which the polar contact remains in the last operated position on cessation of current flow therethrough; a track circuit for the section including a source of current, the rails of the section, a track relay and a normally closed polar contact of said auxiliary relay; train carried and cooperative wayside means effective at a point to the rear of the entrance to the section to momentarily supply current to said auxiliary relay in the proper direction to open its contact, a circuit path by way of which a portion of such current at the same time passes through the track relay in a direction opposite to that supplied to it over said track circuit to accelerate its release, and train carried and wayside means cooperative after the train clears the section to momentarily supply current to said auxiliary relay in the proper direction to reclose its contact.

15. In combination with a section of railway track; a track circuit for the section including a source of current, the rails of the section, a normally closed polar contact of a polarized relay and a track relay; wayside inductive receivers located at the rear and in advance of said section respectively and each having a secondary winding connected in multiple with the winding of said polarized relay, train carried means cooperative with the rear receiver just before a train enters the section to cause current to momentarily flow from the secondary of such receiver in the proper direction to effect operation of the contact of said polarized relay to open the track circuit, and train carried means cooperative with the receiver in advance of the section after the train clears the section to cause current to momentarily flow from the secondary of such receiver in the proper direction to effect operation of the contact of said polarized relay to reclose the track circuit.

16. In combination with a section of railway track, a polarized relay for the section, a track circuit for the section including a source of current, the rails of the section, a normally closed contact of said polarized relay, and a track relay; wayside inductive receivers located at the rear and in advance of said section respectively and each having a secondary winding connected in circuit with the winding of said polarized relay, train carried means cooperative with the rear receiver just before a train enters the section to cause current to momentarily flow from the secondary of such receiver in the proper direction to effect operation of the contact of said polarized relay to open the track circuit, circuit connections between the windings of said polarized relays by way of which current from the secondary of such receiver also flows through the track relay in the reverse to normal direction to accelerate the decay of flux therein an instant before the polar contact is opened, and train carried means cooperative with the receiver in advance of the section after the train clears the section to cause current to momentarily flow from the secondary of such receiver in the proper direction to effect operation of the contact of said polarized relay to reclose the track circuit.

17. In combination, a track section, a relay having an armature biased to its released position and a winding for moving the armature to an operated position, track leads for connecting the winding across the traffic rails of the section, a track circuit including a source of current the traffic rails of the section and the winding of said relay for energizing the winding to actuate and hold the armature in its operated position, a polarized relay having a normally closed polar contact included in the track circuit and which in its reverse position opens the track circuit, means for momentarily energizing said polarized relay by current flow in the proper direction to cause its polar contact to move to its reverse position just prior to the entry of a train into the section, and a second means for momentarily energizing said relay by current flow in the reverse direction just after the train clears the section to cause the polarized relay to restore its polar contact to its normal position.

18. In combination, a railway track section; a track circuit for said section including a source of current, the rails of the section and a track relay; a polarized relay having a contact included in said circuit, an inductive receiver located to the rear of the entrance end of the section, a circuit for said polarized relay including a secondary winding of said receiver and a rectifier unit, a second receiver placed beyond the exit end of the section, a second circuit for said polarized relay including a secondary winding of said second receiver and a second rectifier unit, a train carried inductor on the leading portion of a train approaching the section cooperative with the first encountered receiver to induce a momentary impulse in the secondary winding of such receiver to energize said relay only as required to open its polar contact, and a second train carried inductor on the rear portion of such train cooperative with the receiver beyond the exit end of the section to induce a momentary current impulse in the secondary winding of such receiver to energize said relay only as required to close its polar contact.

THOMAS J. O'MEARA.